United States Patent
Jurisch et al.

(10) Patent No.: US 6,550,601 B2
(45) Date of Patent: Apr. 22, 2003

(54) ALIGNING AND FEEDING DEVICE FOR PANEL-SHAPED WORKPIECES

(75) Inventors: Klaus Jurisch, Hattstedtermarsch (DE); Volker Camen, Alfeld (DE)

(73) Assignee: GreCon Dimter Holzoptimierung Nord GmbH & Co. KG, Alfeld (DE)

( * ) Notice: Subject to any disclaimer, the term of this patent is extended or adjusted under 35 U.S.C. 154(b) by 0 days.

(21) Appl. No.: 09/816,042

(22) Filed: Mar. 23, 2001

(65) Prior Publication Data

US 2002/0023822 A1 Feb. 28, 2002

(30) Foreign Application Priority Data

Aug. 22, 2000 (DE) .......................................... 100 41 241

(51) Int. Cl.$^7$ ........................... B65G 25/00; B65G 47/24
(52) U.S. Cl. ................ 198/345.3; 198/468.3; 198/803.4; 198/803.11; 198/822
(58) Field of Search ........................... 198/345.3, 468.3, 198/803.4, 822, 803.11, 817, 819, 803.1, 818, 820, 836.3, 473.1

(56) References Cited

U.S. PATENT DOCUMENTS

| | | | | |
|---|---|---|---|---|
| 3,805,942 A | * | 4/1974 | Auernhammer | 198/345.3 |
| 4,231,464 A | * | 11/1980 | Nielson | 198/345.3 |
| 5,170,876 A | * | 12/1992 | Sticht | 198/345.3 |
| 5,303,810 A | * | 4/1994 | Tani | 198/345.3 |
| 5,333,716 A | * | 8/1994 | Hoppmann et al. | 198/803.11 |
| 5,366,062 A | * | 11/1994 | Markin et al. | 198/345.3 |
| 5,392,896 A | * | 2/1995 | Martelli | 198/473.1 |
| 5,562,183 A | * | 10/1996 | Naramura | 186/49 |
| 6,050,061 A | * | 4/2000 | Todd et al. | 53/455 |
| 6,161,678 A | * | 12/2000 | Cassoli et al. | 198/626.6 |

* cited by examiner

*Primary Examiner*—Douglas Hess
(74) *Attorney, Agent, or Firm*—Synnestvedt & Lechner LLP

(57) ABSTRACT

In order to monitor the adjustment state of the entrainers (1), which are arranged in each case in pairs transverse to the feed direction (4), of a feed chain (2), it is proposed to arrange an adjusting station along the guide of the feed chain (2) and to arrange a measuring station at a spaced interval therefrom. The adjusting station serves to adjust manually the entrainers (1) in a common adjusting plane extending perpendicular to the feed direction (4), whereas the measuring station is arranged to detect the adjustment position of the two entrainers (1) in a measuring plane likewise perpendicular to the feed direction (4) and, in accordance with a tolerance field which can be defined by the user, to generate an error signal which at the same time renders it possible to identify maladjusted entrainers (1).

16 Claims, 5 Drawing Sheets

ALIGNING AND FEEDING DEVICE FOR PANEL-SHAPED WORKPIECES

The present application is related to German patent document No. 100 41 241.6 dated Aug. 22, 2000, which is hereby incorporated by reference in its entirety.

FIELD OF THE INVENTION

The invention relates to an aligning and feeding device intended for use in a device for the end-side processing of panel-shaped workpieces.

BACKGROUND OF THE INVENTION

The problem of aligning panel-shaped or plate-shaped workpieces with the aim of directing them in the aligned state to end-side processing occurs in numerous functional circumstances. By way of example only, it is possible to refer to the processing of panel-shaped pieces of wood in a flat-dovetailing installation, in which the end sides of the pieces of wood are to be provided with a dovetail profile which extends in parallel to the base plane thereof and which is produced by milling. The exact production of the dovetail profile over the entire width of the wood is an essential prerequisite for the suitability of these pieces of wood for the end-side connection which is characterised by the engagement of adjacent dovetailed profiles. An erroneous alignment process causes the pieces of wood, which are to be connected on the end side, to be misaligned, i.e. they extend at angles with respect to each other.

The applicant has in-house knowledge of an aligning and feeding device which is characterised by a feed chain and which is characterised by a plurality of entrainers which are each disposed in pairs transverse to the feed direction at a spaced interval with respect to each other. The entrainers are disposed on individual chain members in such a way that they can be adjusted in the feed direction and are adjusted in a starting position under the proviso that their edges, which are intended to feed a piece of wood, extend in a common plane perpendicular to the feed direction. However, owing to unavoidable congestion during the production operation and owing to other disruptions, it is not possible to prevent individual entrainers from being maladjusted from the said position, which results in workpieces being misaligned and causes rejects during production.

SUMMARY AND OBJECT OF THE INVENTION

It is the object of the invention to design an aligning and feeding device which is intended for use in a device for the end-side processing of panel-shaped workpieces and which renders it possible in a convenient manner to adjust the entrainers and to monitor the adjustment process including any subsequent adjustment operation. In the case of an aligning and feeding device of this type, this object is achieved by having at least one feed chain which is equipped with entrainers for the workpieces. The entrainers are each arranged in pairs on the feed chain at a spaced interval with respect to each other transverse to a feed direction. The entrainers can be adjusted in their position in the feed direction by means of an adjusting station for the purpose of aligning the position of the entrainers relative to an adjusting plane perpendicular to the feed direction. A measuring station is used for the contact-free detection of the positions of the entrainers relative to a measuring plane perpendicular to the feed direction. The measuring station and the adjusting station are disposed along a guide of the feed chain. The measuring station is arranged to generate measurement values for the purpose of describing the position of the entrainers relative to the measuring plane.

Accordingly, essential aspects of the invention include the arrangement of an adjusting station and a measuring station along the guide of the feed chain, wherein the measuring station is arranged to generate signals which describe the position of the entrainers relative to a measuring plane. While the adjusting station merely serves to adjust the position of the entrainers relative to an adjusting plane, i.e. on a frequent basis for manual alignment of the entrainers, the measuring station can be used for monitoring purposes and used in conjunction with a higher-ranking control for the purpose of visualising the adjustment state of all of the entrainers. At the same time, this renders it possible to identify the entrainer(s) which is/are currently maladjusted. One fundamental idea of the subject matter of the invention is thus to subject the adjustment state of entrainers to a permanent monitoring process during the operation of the device; so that disruptions in the form of maladjustments can be indicated and eradicated in a suitable manner. However, as an alternative to a continuous monitoring process it is also possible to check and log the adjustment state of all of the entrainers of the feeding device outside of the regular production operation of the device, i.e. in a separate measuring procedure. In each case, the adjustment position of the entrainers is monitored, which enables any deviations in position of the entrainers to be identified at the earliest possible point in time.

The adjusting station consists of a stop bar which can be moved into and removed from the feed path of the entrainers. The stop bar is provided in each case with stop bodies which lie in the adjusting plane and are intended to cooperate in each case with an entrainer pair. For example, the stop bodies are structurally formed by hemispherical stops which are adjusted in a precise manner relative to the stop bar, so that the entrainers which lie with their facing sides against these stops assume their desired position. One particularly advantageous embodiment of the stop bar resides in the fact that it can be pivoted about an axis extending in parallel with the feed direction, wherein the different pivot positions relative to this axis define the active and the inactive position of the feed bar. Accordingly, the latter can be pivoted manually about this axis between its two positions.

The measuring station which, corresponding to the entrainers arranged in each case in pairs, consists of two radiation barriers, e.g. light barriers which extend perpendicular to the feed direction and of which each is arranged for the purpose of generating a signal which indicates an interruption in the respective beam path. The measuring station is allocated an evaluating unit, in particular a control system, a computer or a comparable system, whose purpose is to evaluate the signals received by way of the light barriers and, whilst maintaining a desired level of measuring accuracy, to generate in the shortest time a signal which describes the adjustment state of the entrainers, where necessary an error signal. In practical terms, a tolerable deviation of the adjustment position of the entrainers is specified by the user, so that an error signal is produced in dependence upon a tolerance window. The radiation barrier used can be any system which consists of a transmitter and a receiver and whose functional principle is based upon the interruption of the beam path based between the transmitter and the receiver.

The two radiation barriers can essentially be disposed in a common plane perpendicular to the feed direction, wherein owing to the passage of the entrainers, in particular a time difference between the two passages, it is possible to use the points in time of the interruption of the beam paths to deduce the positions of the entrainers. However, with respect to lower assembly and adjusting outlay it is more advantageous if the two radiation barriers as seen in the feed direction— are disposed offset with respect to each other by a defined path element. This means that in the correctly adjusted state of two entrainers at a given speed the signals which are generated by the two beam paths are offset with respect to time and corresponding to this path element. This renders it possible to describe deviations from a desired position of the two entrainers by deviations from the value of a time difference and to generate error signals from these deviations according to a tolerance field which can be specified by the user.

Each evaluating unit is arranged to generate those signals which describe the deviation of the entrainer from a desired position and which also render it possible to identify the respectively measured entrainer, all of the information required for the subsequent adjusting process is available. This type of evaluation can be performed very rapidly, since by means of the evaluating unit 52 which is to be allocated to the measuring station, the required arithmetic procedures can run according to substantially shorter cycle times than those of a higher-ranking control system. In turn, this represents a significant contribution towards increasing the measuring accuracy. The use of a higher-ranking control system 54 for the purpose of implementing the arithmetic procedures associated with a measurement evaluation process would result in substantially longer measuring times in view of the cycle times which are required owing to the greater degree of complexity of the programmes installed in said control system.

The evaluating unit is operatively connected to the control system of the device by way of a suitable bus system. Within the framework of the aforementioned control system, it is possible randomly to evaluate, visualize and otherwise convert the signals generated by the measuring station.

The feeding speed of the feed chain is controllable—a condition which can be used in a particularly advantageous manner for the purpose of illustrating a measuring procedure, namely a complete revolution of the continuous-feed chain which is merely directed to measuring the adjustment position of the individual entrainers. Accordingly, it is possible for example to operate at a lower feeding speed for comparatively short path elements which correspond to the passage of the entrainers through the measuring station and also at a higher feeding speed. In this manner, it is possible to guarantee a high degree of measuring accuracy whilst at the same time limiting the time required for verifying the positions of all of the entrainers of a feed chain which is characterised by numerous pairs of entrainers.

BRIEF DESCRIPTION OF THE DRAWINGS

The invention will be explained in detail hereinunder with reference to the exemplified embodiment illustrated schematically in the drawings, in which.

DETAILED DESCRITPION

Figure 1:
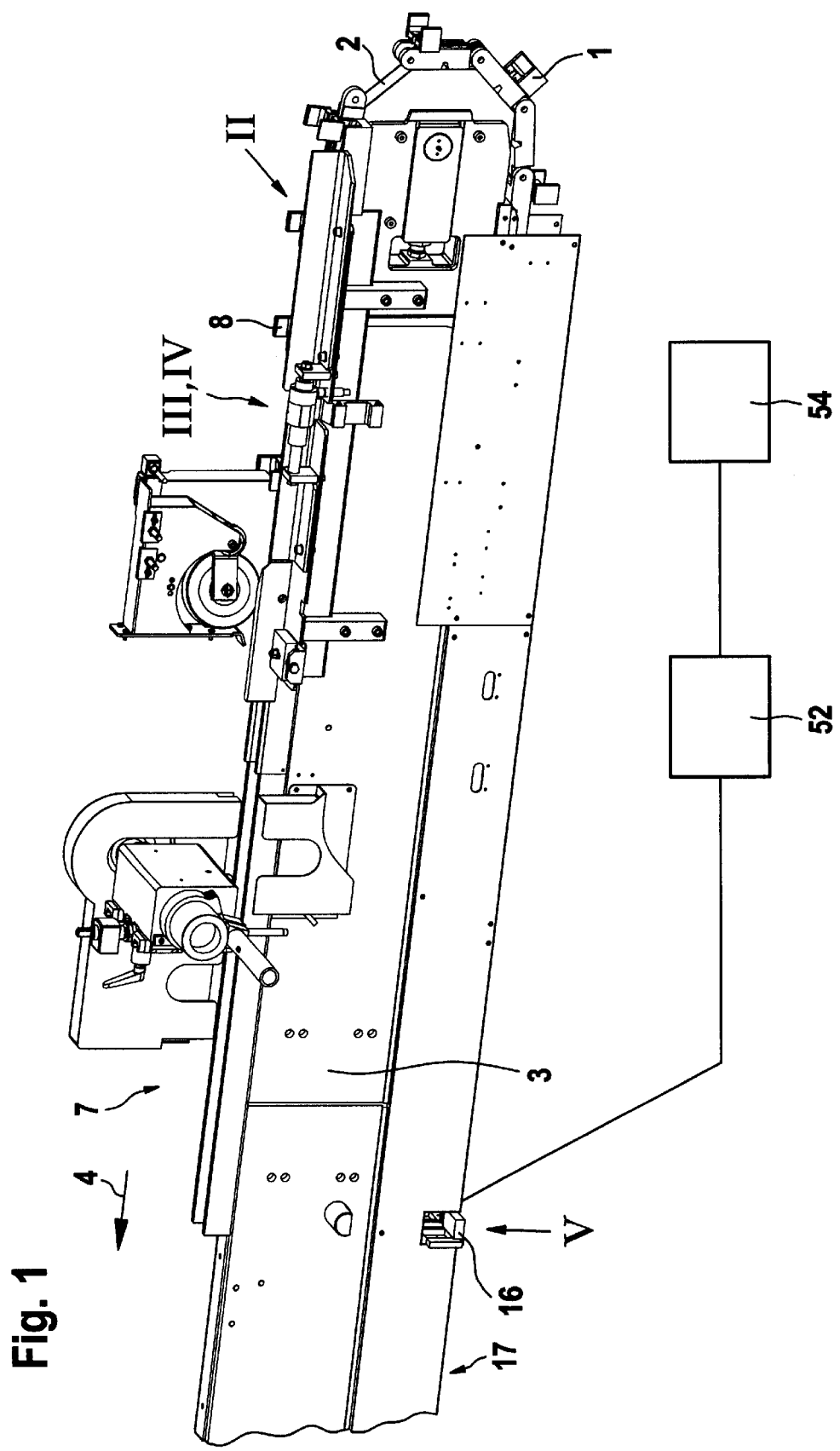
FIG. 1 shows a partially perspective view of a feed chain, which is equipped with entrainers, together with guide members.

The feed chain 2 illustrated in FIG. 1 forms an element of a flat-dovetailing installation which is intended to provide the end sides of panel-shaped pieces of wood with dovetails which extend in parallel with the base plane thereof. These pieces of wood can be fitted into and connected to each other, with gluing, on the end side in the region of their dovetails for the purpose of forming straight lengths of wood. In order to preserve the linearity of these lengths of wood it is extremely important that the dovetail profile which is to be introduced on the end side has a uniform depth over the entire width of the wood, which requires the respective piece of wood to be held in a defined alignment with respect to a milling machine.

A defined alignment is afforded to the pieces of wood by the cooperation of the illustrated feed chain 2 which is equipped in each case with entrainers 1 arranged in pairs and which is disposed on a guide device 3 and can be driven in a speed-controllable manner in one direction 4 by virtue of means which are not illustrated in detail in the drawings. The guide device 3 forms a base body which extends in a horizontal manner and around which the feed chain 2 is guided as a continuous chain.

The feed chain 2 consists of an arrangement of chain members 5, each of which has two entrainers 1 which are disposed perpendicular to the feed direction 4, i.e. horizontally speed apart from each other. The chain members 5 are releasibly connected to the respective chain member and are disposed thereon in an adjustable manner in each case in particular in the longitudinal direction of the chain member 5, i.e. in parallel with the feed direction 4.

Figure 2:
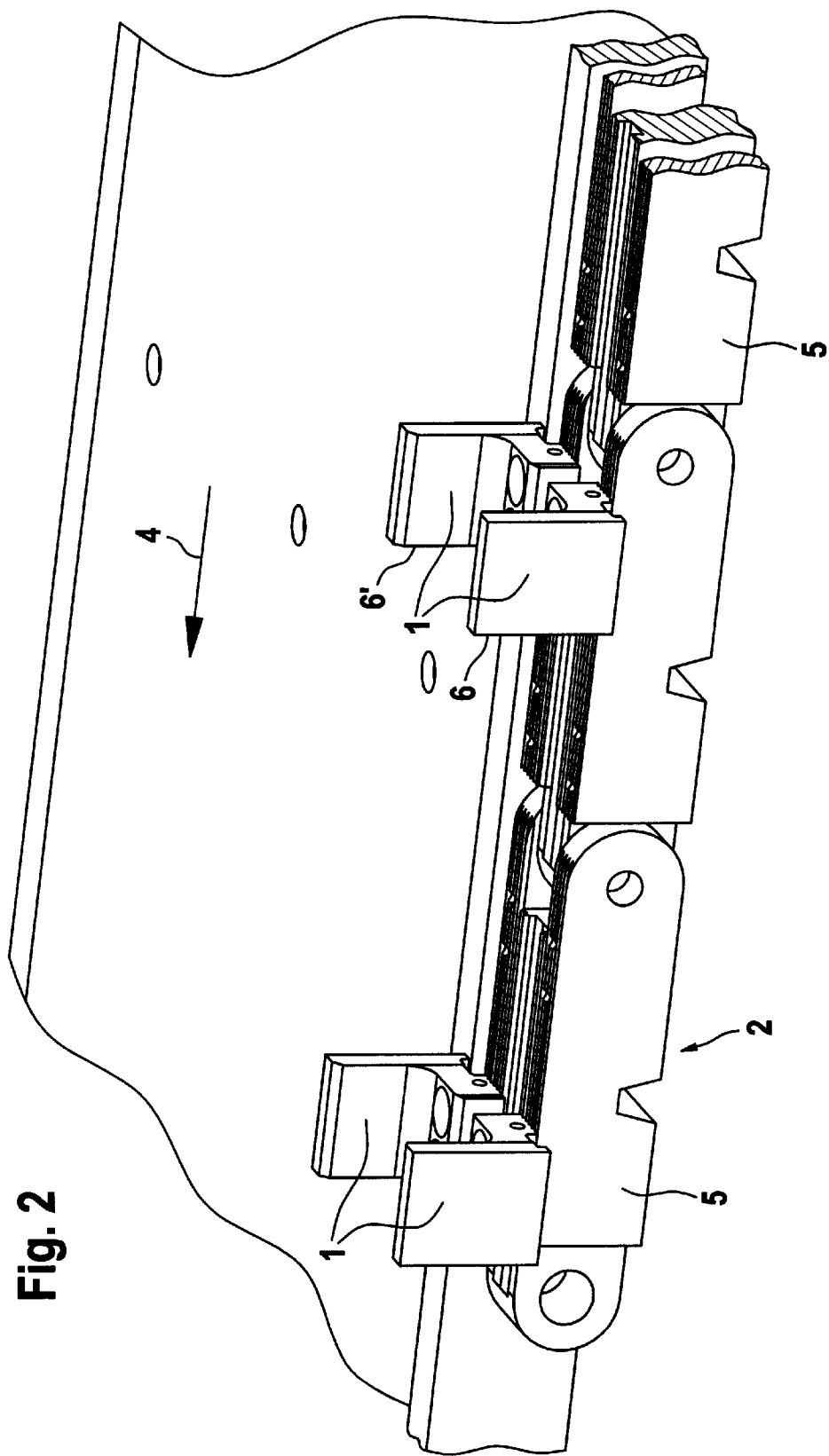
FIG. 2 shows an enlarged partial view of the feed chain according to arrow II of FIG. 1 in a perspective illustration.

Each of the entrainers 1 which are designed in an identical manner to each other comprises a generally angular basic shape, of which the respective horizontal part is intended for attachment to the chain members and of which the respective vertical portion is intended to exert an entrainer effect upon the wood which is to be processed. In this way, the end faces of the vertical limbs are designated in FIG. 2 by the reference numerals 6, 6' and are each designed as entrainer edges for a piece of wood. These entrainer edges 6, 6' are located—as seen in the feed direction 4—in a common plane for the purpose of aligning the entrainers 1 in an exact manner.

By virtue of the fact that in the course of the upper run 7 the pieces of wood lie with their slim longitudinal sides against the said entrainer edges 6, 6', they are subjected to an alignment, in which they are located in a position which is suitable for providing an end-side dovetail profile in parallel to their base planes. The milling processing for producing this profile takes place after the pieces of wood have been fixed in this position using suitable means which, however, will not be discussed further at this point.

The processing procedure on this type of flat-dovetailing installation takes place continuously, wherein pieces of wood with different lengths are processed. However, owing to the unavoidable disruptions in the production sequence individual entrainers can be maladjusted and this can lead to positional errors in the dovetail profile and corresponding angular deviations in the lengths built up from the pieces of wood. In accordance with the invention, the guide device 3 is provided in the region of the upper run, namely at the site 8 of an adjusting station, which has a measuring stop, whose structure and mode of operation will be explained in detail hereinunder.

Figure 3:
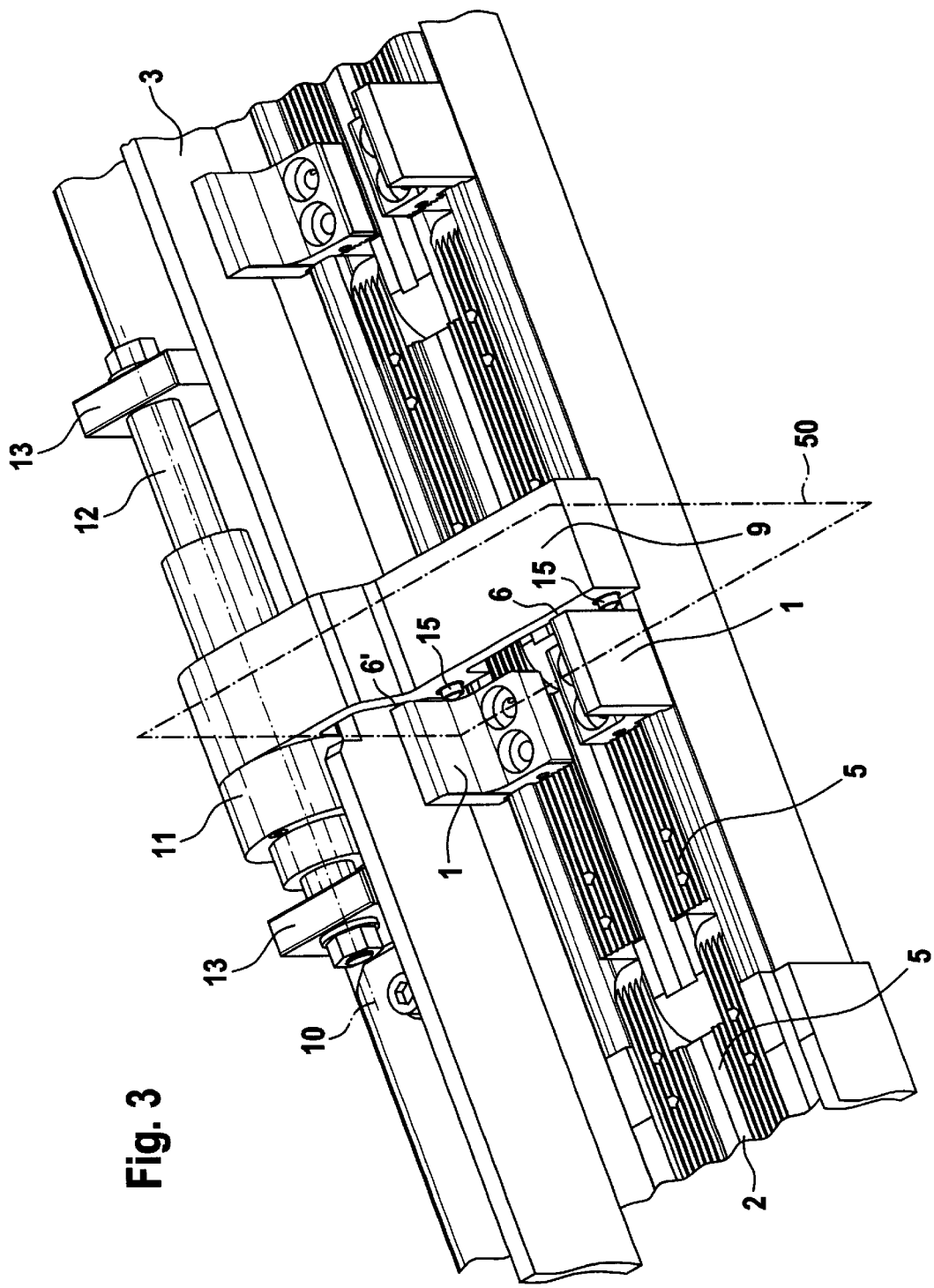
FIG. 3 shows an enlarged perspective partial view of a measuring stop according to arrow III of FIG. 1 in the active position.

The measuring stop generally consists of a stop bar 9 which is mounted in such a manner as to be able to pivot about an axis 10 which extends in parallel with the direction 4. The pivot capability of the stop bar 9 is provided between an active position illustrated in FIG. 3 and an inactive position illustrated in FIG. 4.

The stop bar 9 is fixedly connected to a bearing bush 11 which is mounted in a longitudinally displaceable manner on a guide rod 12 and is mounted in a rotatable manner about the axis 10 thereof. The guide rod 12 which thus extends in parallel with the feed direction 4 is attached to the guide device 3 by means of two mutually spaced apart bearing plates 13, and furthermore in a lateral manner with respect to the feed chain 2. The bearing bush 11 can be fixed in an axial manner in a defined position with respect to a displacement in the direction of the guide rod 12, wherein the ability to rotate freely is maintained.

The reference numeral 14 denotes a sensor which is intended and arranged to identify the rotation angle position of the bearing bush 11, in particular to identify the active or inactive position of the stop bar 9. Preferably, this is a sensor which is based upon the principle of contact-free function and is arranged in each case for generating a signal representing the position of the stop bar 9 and is operatively connected to a higher-ranking control of the flat-dovetailing installation.

The reference numeral 15 designates two e.g. hemispherical stops which are attached laterally to the stop bar and which are attached to the guide bar 9 under the proviso that their respective apex points are located in a plane perpendicular to the feed direction 4, i.e. in a plane which is considered as the stop plane for adjusting the entrainers 1.

Figure 4:
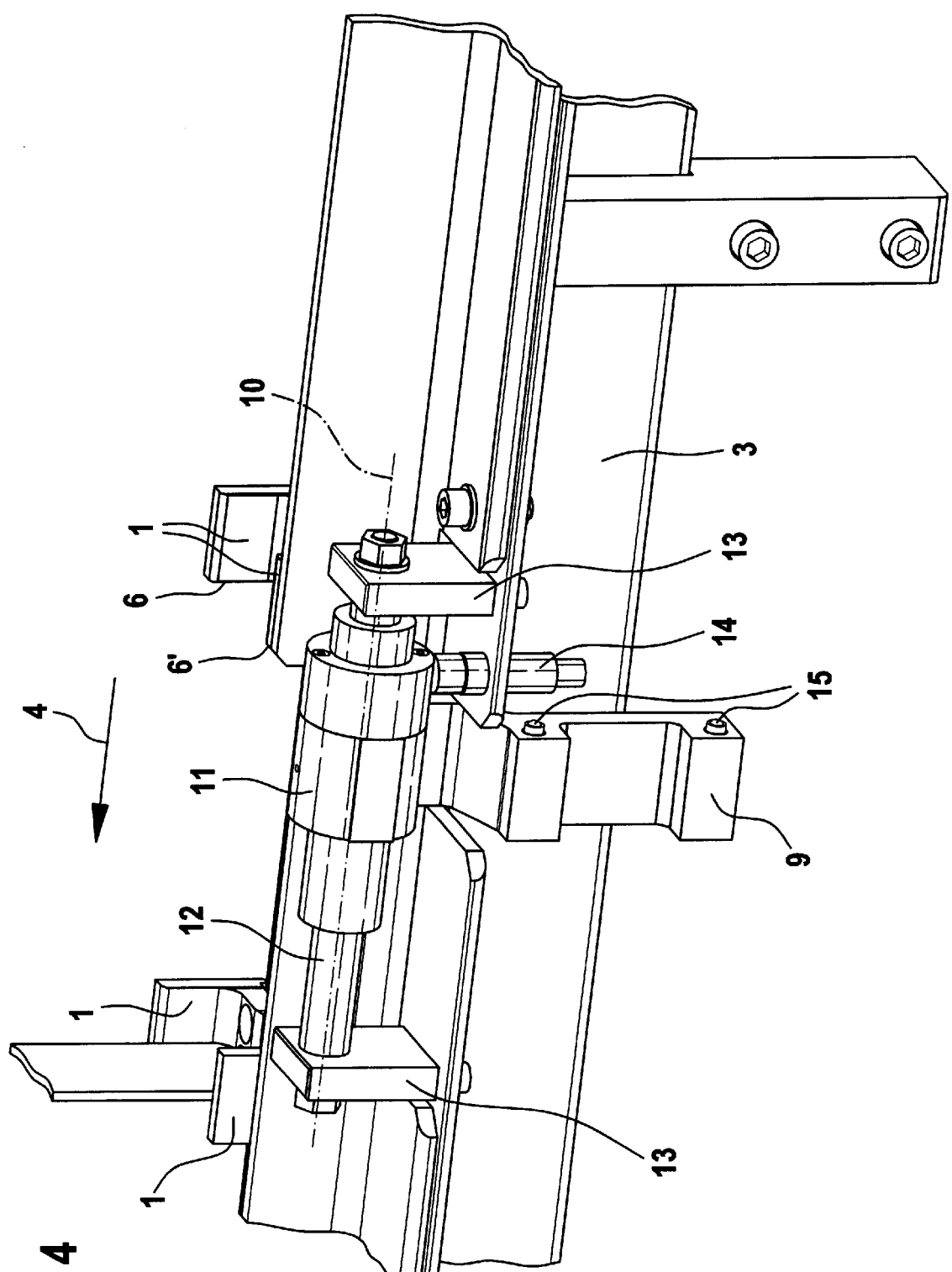
FIG. 4 shows an enlarged partially perspective illustration of the measuring stop according to arrow IV in the inactive position.

In accordance with the invention, the measuring stop which is formed by virtue of the stop bar 9 is used inter alia for the initial alignment of the entrainers 1. For this purpose, the entrainer bar 9 is initially pivoted from the inactive position as shown in FIG. 4 to an active position which is characterised by virtue of the fact that the entrainer bar 9 is located in the movement path of the entrainers 1. The adjacent entrainer 1 is adjusted in such a manner that the entrainer edges 6,6' are located in the platen 50 which is defined by the stops 15, so that after accordingly fixing all of the entrainers 1 the initial alignment process is completed. In the active position of the entrainer bar 9 the sensor 14 electrically blocks the drive of the feed chain 2 thus preventing it from being switched on unintentionally.

Figure 5:
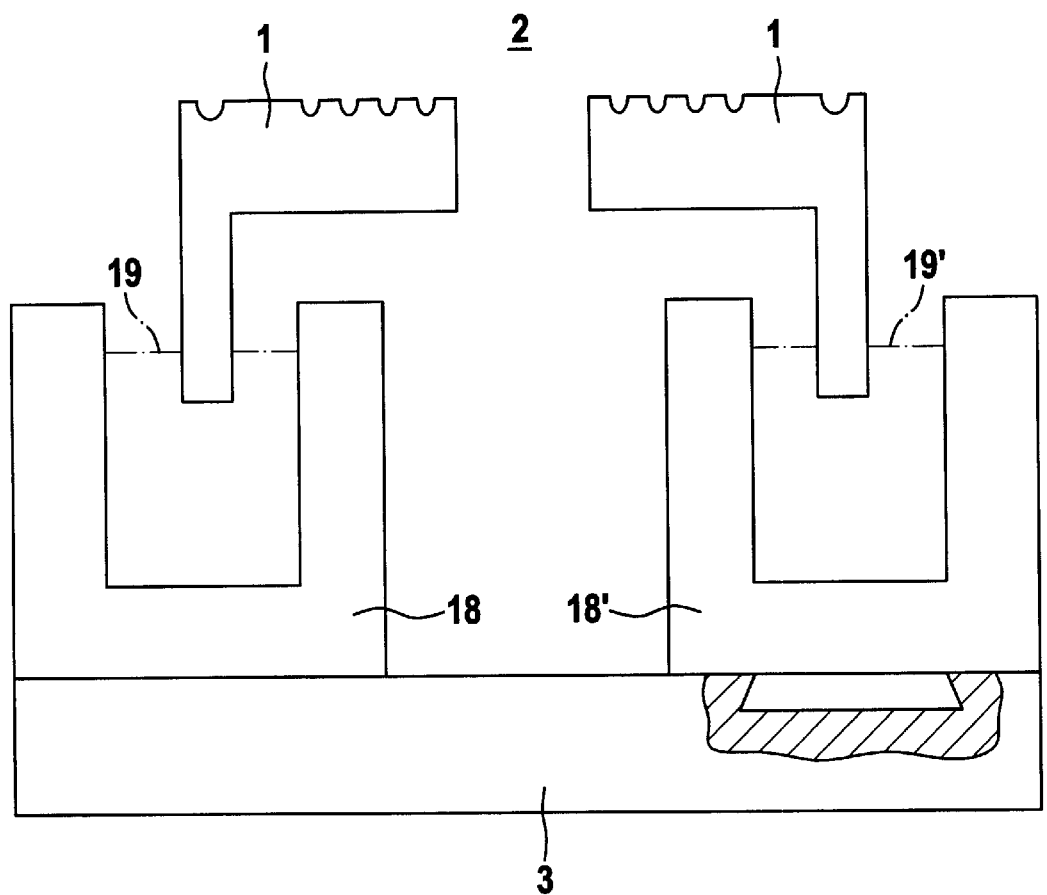
FIG. 5 shows a schematic illustration of a measuring device for the purpose of detecting the position of the entrainers.

At point 16, i.e. in the region of the lower run 17, there is located a measuring station which will be explained in detail hereinunder with reference to FIG. 5 of the drawing and whose purpose is to check the alignment of the two entrainers 1 which are disposed in each case in pairs. For this purpose, there are provided two identically designed light barriers 18, 18' which comprise in each case fork-shaped housings and are disposed in the passage region of the vertical limbs of the entrainers 1 which in the feed direction 4 are, however, arranged in an offset manner with respect to each other by a path element. This means that according to the offset arrangement, provided in the feed direction, of the beam paths 19, 19' of the said light barriers 18, 18' at a given feeding speed, the signals generated by the light barriers are offset accordingly with respect to time. The light barriers 18, 18' are arranged in such a manner that they generate a signal as soon as their beam paths 19, 19' are interrupted which is the case as soon as the said entrainer edges 6, 6' reach the respective beam paths.

Not illustrated in the drawing are the drive, which is allocated to the feed chain 2, and a control which is allocated to said drive. However, it is now an essential aspect of the invention that the said measuring station is allocated a dedicated control in the form of a memory-programmable control or a computer, by way of which all of the measuring and evaluating procedures, which are connected to the process of measuring the adjustment position of the entrainers 1, are performed and transmitted in a processed form to the control of the flat-dovetailing installation or a control of the aligning and feeding device.

Another essential aspect of the invention is that the feed chain 2 can be operated according to a regular operation, a measuring operation without any adjustment procedure and according to a measuring operation with an adjustment procedure, wherein the last named two operating states signify that the speed of the feed chain is modulated at intervals. If this relates to a measuring operation without any adjustment, then a comparatively rapid feed of the feed chain 2 takes place between two entrainer pairs relative to the measuring station and a feed operation, which is slow in consideration of the attainable measuring accuracy, takes place in the region of the measuring station. The last-named measuring operation is used for the purpose of monitoring the entire feed chain 2, wherein the measurement result can be logged. If a measuring operation is performed together with an adjustment, each maladjusted entrainer pair is stopped in the adjusting station, so that a readjustment can be performed manually. In this case, a further feed of the feed chain is triggered manually in each instance. Therefore, the feed chain regularly operates in a regular manner, in which the measuring station does not function. In so far as the cycle times of the said evaluating unit, which cooperates with the measuring station, are adequate whilst maintaining the required level of measuring accuracy, it is possible in this manner also to monitor the position of the entrainers 1 in a continuous manner.

Within the framework of a flat-dovetailing installation, the feed chain 2 which is equipped in accordance with the invention thus renders it possible using comparatively straightforward and cost-effective means to align in an exact manner and to monitor entrainers, which are arranged in pairs, in a common plane perpendicular to the feed direction 4 and in this manner it is possible to achieve an improved dimensional accuracy in the end-side dovetails which are to be produced. According to tolerable deviations, it is possible to fix a time window relative to a desired value of a running time difference, which is provided by the offset arrangement of the said light barriers, of the signals generated by the two light barriers, wherein it is possible, as desired, within the framework of a master-machine control to evaluate, log and indicate the situation, in which the limits defined by said time window are exceeded. In particular it is possible to identify in a convenient manner a maladjusted entrainer pair and the movement thereof into the adjusting station which is characterised by the stop bar 9.

What is claimed is:

1. An aligning and feeding device adapted for use in an apparatus for the processing of an end-side of a panel shaped workpiece, said apparatus having at least one feed chain movably mounted on a guide for movement in a feed direction oriented substantially along said guide, a plurality of entrainers for receiving the workpieces being adjustably positioned at spaced intervals along said feed chain, said entrainers being movable by said chain along a feed path defined by said guide, said entrainers being arranged in pairs and spaced apart from one another transversely to said feed direction, said aligning and feeding device comprising:

an adjusting station positioned along said guide for aligning the position of said entrainers relative to an adjusting plane oriented perpendicular to said feed direction; and a measuring station positioned along said guide for contact-free detection of the positions of said entrainers relative to said adjusting plane oriented perpendicular to said feed direction, said measuring station being capable of generating measurement values describing the positions of the entrainers relative to said adjusting plane.

2. An aligning and feeding device according to claim 1, wherein said adjusting station comprises:
a stop bar movable into and removable from said feed path of said entrainers; and
two mutually spaced apart stop bodies mounted on said stop bar, each stop body being engageable with a respective entrainer of one of said pairs of entrainers when said stop bar is moved into said feed path, said stop bodies being intended for aligning said respective entrainers in each said entrainer pair.

3. An aligning and feeding device according to claim 2, wherein said stop bodies comprise hemispherical stops.

4. An aligning and feeding device according to claim 2, wherein said stop bar is pivotably mounted on said guide and pivotable about an axis which extends substantially parallel to said feed direction, said stop bar being pivotable between an active position located within said feed path of said entrainers and an inactive position removed from said feed path.

5. An aligning and feeding device according to claim 2, wherein said measuring station comprises two radiation barriers, each being oriented perpendicular to said feed direction and arranged to generate a signal which indicates an interruption of said barriers.

6. An aligning and feeding device according to claim 1, wherein said measuring station comprises two radiation barriers, each being oriented perpendicular to said feed direction and arranged to generate a signal which indicates an interruption of said barriers.

7. An aligning and feeding device according to claim 6, wherein said measuring station further comprises a computer-aided evaluating unit for the computer-aided evaluation of the signals generated by said radiation barriers.

8. An aligning and feeding device according to claim 7, wherein said evaluating unit is arranged to generate signals representing the position of a pair of said entrainers with respect to the adjusting plane, so that with reference to these signals it is possible to represent the adjustment state of each pair of entrainers.

9. An aligning and feeding device according to claim 8, further comprising a higher-ranking control system, said evaluating unit being operatively connected to said higher-ranking control system.

10. An aligning and feeding device according to claim 7, further comprising a higher-ranking control system, said evaluating unit being operatively connected to said higher-ranking control system.

11. An aligning and feeding device according to claim 6, wherein said radiation barriers are arranged offset with respect to each other when viewed along said feed direction.

12. An aligning and feeding device according to claim 11, wherein said evaluating unit is arranged to generate signals representing the position of a pair of said entrainers with respect to the adjusting plane, so that with reference to these signals it is possible to represent the adjustment state of each pair of entrainers.

13. An aligning and feeding device according to claim 1, wherein said feeding chain has a feeding speed which can be controlled.

14. A method of measuring the position of entrainers relative to an adjusting plane of an aligning and feeding device using an evaluating unit, said entrainers each being arranged on a feed chain in pairs spaced transverse to the feed direction of said feed chain and at spaced intervals from each other along said feed chain, said method comprising the step of operating said feed chain during a measuring procedure such that during a time interval corresponding to the passage of an entrainer pair through a measuring station, a feeding speed is adopted which is based on data from the evaluating unit.

15. A method according to claim 14, further comprising the step of generating an error signal indicating the presence of maladjusted entrainers by means of an evaluating unit, said error signal being generated upon measurement of a deviation between a desired position of the entrainers and a measured position which exceed a tolerable deviation, said error signal also containing information for locating the maladjusted entrainers.

16. A method according to claim 15, further comprising the step of moving a maladjusted entrainer pair into an adjusting station with the cooperation of a control system of said device.

* * * * *